(12) United States Patent
De Rycke et al.

(10) Patent No.: US 9,003,966 B2
(45) Date of Patent: Apr. 14, 2015

(54) SQUARE BALER WITH IMPROVED AIRFLOW PAST THE KNOTTERS

(75) Inventors: Stefan De Rycke, Olsene-Zulte (BE); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/118,766

(22) PCT Filed: May 15, 2012

(86) PCT No.: PCT/EP2012/059036
§ 371 (c)(1),
(2), (4) Date: Mar. 7, 2014

(87) PCT Pub. No.: WO2012/156410
PCT Pub. Date: Nov. 22, 2012

(65) Prior Publication Data
US 2014/0196615 A1 Jul. 17, 2014

(30) Foreign Application Priority Data

May 19, 2011 (BE) .................................. 2011/0304

(51) Int. Cl.
*A01B 71/08* (2006.01)
*A01F 15/14* (2006.01)

(52) U.S. Cl.
CPC ............... *A01B 71/08* (2013.01); *A01F 15/145* (2013.01); *A01F 15/14* (2013.01)

(58) Field of Classification Search
CPC .............................. A01F 15/14; A01F 15/145
USPC ........... 100/29, 33 R, 102; 56/12.8, 343, 433; 289/2
See application file for complete search history.

(56) References Cited

U.S. PATENT DOCUMENTS

| | | | |
|---|---|---|---|
| 3,020,829 A * | 2/1962 | Pearson | 100/102 |
| 4,805,391 A * | 2/1989 | De Zylva | 56/343 |
| 4,951,452 A * | 8/1990 | Lundahl et al. | 56/341 |
| 7,318,376 B1 | 1/2008 | Baldauf et al. | |
| 7,900,555 B2 | 3/2011 | Webber | |
| 2007/0175611 A1 | 8/2007 | Roth et al. | |

* cited by examiner

*Primary Examiner* — Jimmy T Nguyen
(74) *Attorney, Agent, or Firm* — Seyed V. Sharifi T.; Patrick M. Sheldrake

(57) ABSTRACT

At least part of the side of the crossbeam facing the knotter is inclined at an angle of more than ninety degrees to the upper wall of the baling chamber in order to permit a smooth flow of air from the fan past the knotter.

4 Claims, 3 Drawing Sheets

SQUARE BALER WITH IMPROVED AIRFLOW PAST THE KNOTTERS

This application is the US National Stage filing of International Application Serial No. PCT/EP2012/059036 filed on May 15, 2012 which claims priority to Belgian Application BE2011/0304 filed May 19, 2011, each of which is incorporated herein by reference in its entirety.

FIELD OF THE INVENTION

The present invention relates to a square baler.

BACKGROUND OF THE INVENTION

Square balers are agricultural machines that pick up a swath or windrow of crop material, such as straw or hay, from the ground and compact it into bound bales. The crop material is picked up into an infeed housing or chute from which it is conveyed by a feed mechanism, termed a stuffer, through an inlet to a baling chamber. The baling chamber is defined by four walls that are surrounded and supported by a rigid frame. In the baling chamber, the crop material is urged rearwardly by a reciprocating plunger to form a rectangular package of compacted material. Knives positioned on the plunger sever the crop material at the juncture of the baling chamber and the crop inlet as the plunger passes so that the plunger may urge the crop material rearwardly in the baling chamber to form the compressed crop package in the rearward end of the baling chamber. The package so formed is tied by a tying mechanism to complete the bale, which is then discharged from the chamber by being urged rearwardly by the next bale to be formed. Completed bales are either deposited on the ground for subsequent retrieval or they are delivered by appropriate means to a trailing wagon hitched to the back of the baler.

The tying mechanism wraps transversely spaced lengths of twine around each bale after it has reached the desired size and forms knots in the twines before the bale is discharged. Knotters are disposed above the baling chamber in a row transverse to the direction of reciprocation of the plunger. The knotters are arranged adjacent a large crossbeam of square cross section that forms part of the frame surrounding and supporting the walls of the baling chamber.

Individual lengths of twine are drawn from respective reels. At the commencement of formation of each bale, the free end of each length of twine is retained within a knotter and a run of twine extends vertically through the baling chamber from the knotter to the supply reel. As the bale grows, twine is drawn from the reel and when the bale reaches its desired size, an arcuate arm, called a needle, raises the twine from beneath the bale to the level of the knotter to form a complete loop around the bale. The knotter then ties the ends of the loop surrounding the bale, severs the loop from the remainder of the twine and retains the free end of the twine to commence the tying of the next bale.

In order to raise the twine to the level of the knotters so as to complete the loop, the needles need to pass vertically through the front end of the baling chamber. By necessity, at the time that the needles traverse the front end of the baling chamber, the chamber is full of crop material and inevitably the needles will also raise some crop material to the level of the knotters. As a consequence, crop material accumulates around the knotters and this can cause the knotters to malfunction.

It has been proposed previously to provide fans to blow away any crop material that collects around the knotters but hitherto such fans have not proved entirely effective.

SUMMARY OF THE INVENTION

According to the present invention, there is provided a square baler having a baling chamber with four side walls, a support frame surrounding the walls of the baling chamber, at least one knotter mounted on the outer side of the upper wall of the baling chamber adjacent a crossbeam of the support frame, and a fan disposed on the opposite side of the knotter from the crossbeam to blow away crop material from the vicinity of the knotter, wherein at least part of the side of the crossbeam facing the knotter is inclined at an angle of more than ninety degrees to the upper wall of the baling chamber in order to permit a smooth flow of air from the fan past the knotter.

The invention is predicated on the realisation that the square section support beam conventionally located adjacent the knotters on their opposite side from the fans interfered with the air flow and created regions with eddies and dead spots (stationary air) within which crop would collect. In the invention, the cross sectional shape of the crossbeam is modified to avoid eddies and dead spots and permit smooth air flow past the knotters.

As well as streamlining the air flow over the crossbeam, it is preferred for the crossbeam to be shaped to provide an additional air flow passage between the crossbeam and the upper wall of the baling chamber.

In a preferred embodiment of the invention, a casing is provided to support the fan and to enclose the knotter so to guide the air flow from the fan over the knotter. The casing ensures that all the air moved by the fan flows past the knotter and it may be shaped to direct the air flow to regions where it will have an optimum effect on reducing crop accumulation.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 1:
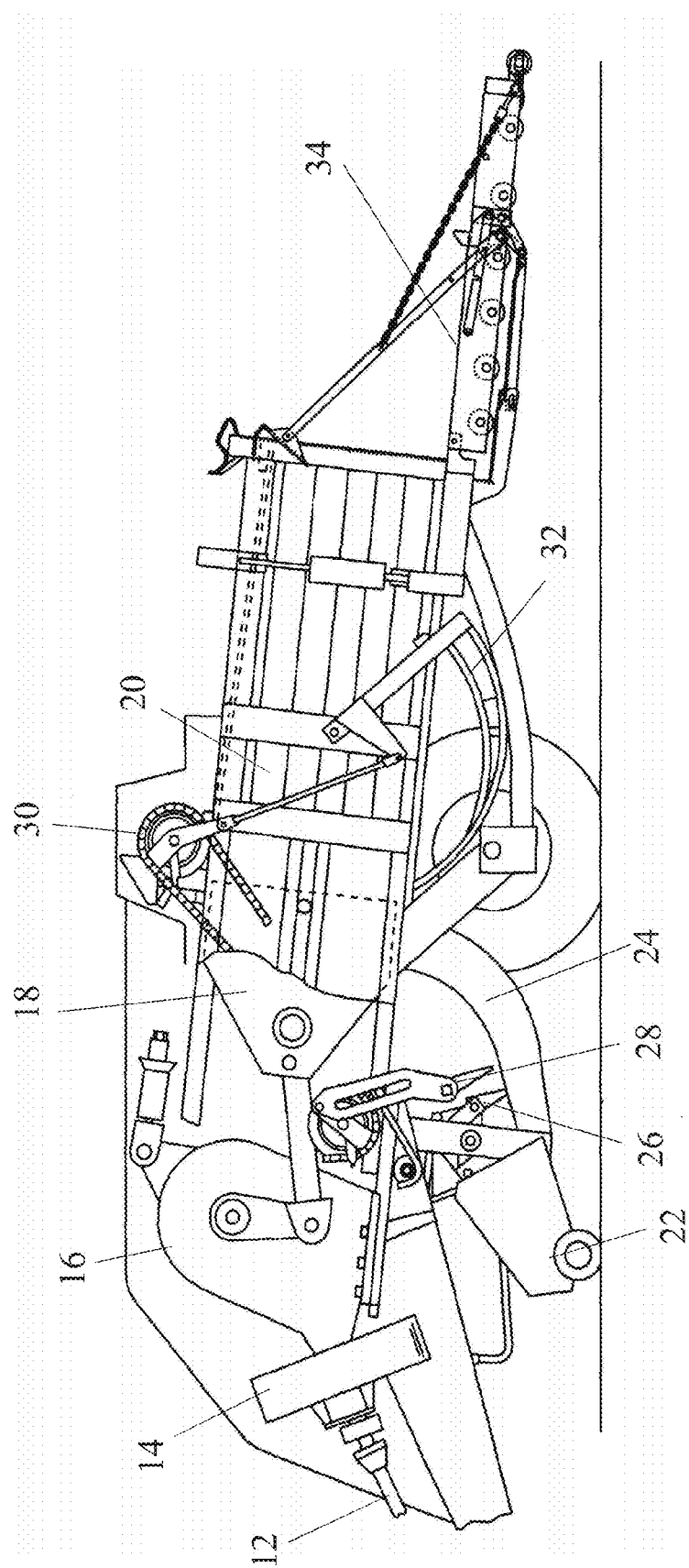
FIG. 1 is a side view of a square baler.

The square baler 10 of FIG. 1 is itself well known and will be described briefly herein only by way of background. The left hand end of the baler, as viewed in all the drawings, has a point of attachment to a tractor (not shown) and the various mechanisms of the baler are driven by an input shaft 12 connected to the PTO shaft of the tractor. The input shaft 12 is connected by way of a flywheel 14 to a gearbox 16 that drives a plunger 18 that reciprocates within a baling chamber 20.

As the baler is towed over windrows that have previously been laid on the ground, for example by a combine harvester, crop material is raised from the ground by a pickup 22 and fed into an intake housing or chute 24 by a packer 26. When the intake housing 24 is full and the plunger 18 is fully retracted, a stuffer 28 transfers the contents of the intake housing 24 into the baling chamber 20 to form a crop slice of the bale. The crop material is then pushed into the baling chamber by the plunger 18, compressing it against crop already material filling the baling chamber.

Above its top wall, a row of knotters 30 extends across the width of the baling chamber. At the commencement of a baling cycle, the end of a length of twine is gripped by each knotter and a run of twine extends downwards from the knotter through the height of baling chamber to a supply reel. As the bale grows, twine is drawn from the reel and passes around the top, rear and lower surfaces of the bale. When the bale reaches the desired size, a needle 32 pivots clockwise as viewed and raises the twine from underneath the bale to the level of the knotter 30 to form a run on the front face of the bale and complete the loop surrounding the bale. The knotter 30 then ties the ends of the twine together by forming a knot and severs the loop from the twine drawn from the reel. The knotter grips the free end of the twine after it has been severed from the loop surrounding the tied bale in order to commence the next bale.

The formation of each bale pushes the previously completed bale out of the baler and eventually the completed bales are lowered gently onto the ground by an inclined discharge chute 34 which can be raised to a vertical position to close the baling chamber when the baler is being transported.

As the needles 32 pass through the baling chamber 20, their ends entrain crop material into the knotter 30. The present invention is concerned with avoiding accumulation of such crop material around the knotters, which may cause them the malfunction.

It is known to mount fans 45 forwards of the knotters to blow away the crop material and prevent it from accumulating. However, conventionally, the air flow over the knotters 30 was not optimised. In particular, the knotters 30 were arranged immediately in front of a crossbeam that forms part of a frame surrounding and supporting the walls of the baling chamber. The crossbeam was of square cross section and such a crossbeam design modifies the air flow by creating eddies and dead spots that interfere with the removal of crop material from the vicinity of the knotters 30.

Figure 3:
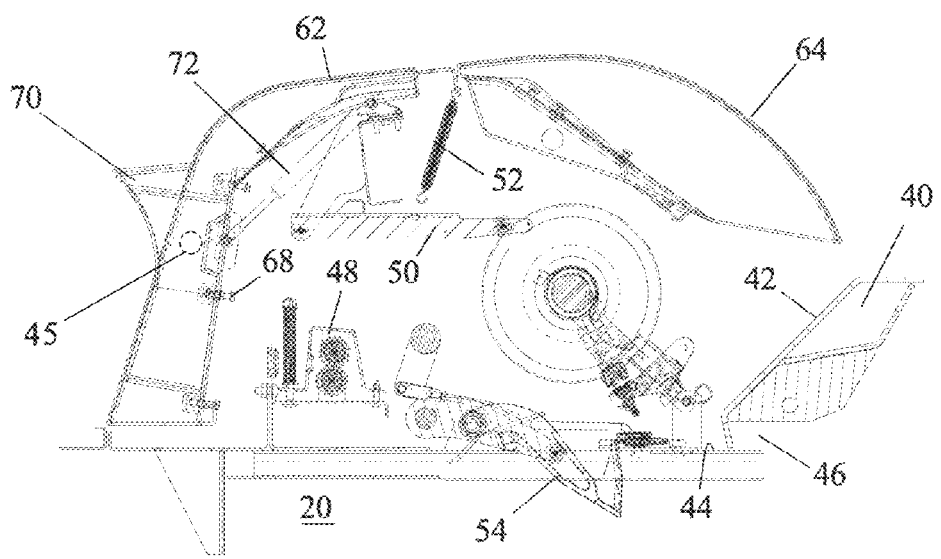
FIG. 3 is a section through the casing of FIG. 2.

As illustrated in FIG. 3, the crossbeam 40 positioned to the rear of the knotters 30 has an inclined face 42 on its side nearer the knotters 30 making an angle of more than 90° with the top wall 44 of the baling chamber 20. Furthermore, an air passage 46 is formed between the underside of the crossbeam 40 and the wall 44 of the baling chamber 20. The effect of these two modifications is that there is no dead spot at the junction between the crossbeam 42 and the top wall 44 of the baling chamber and eddies are reduced in that flow over the crossbeam is now more streamlined.

Air is blown over the knotters by three fans mounted within a casing 60 that covers the knotters 30. The casing is shown in perspective FIG. 2 and will be described below with reference to the section of FIG. 3.

In FIG. 3, there is shown a knotter lying forward of the crossbeam 40. The construction of knotters is well known and will not be described herein in detail as the knotter design is not of fundamental importance to the present invention.

For completeness, FIG. 3 shows other known components that are concerned with the tying process rather than with avoiding crop accumulation. These components include a twine gripping device 48 and a twine tensioning arm 50 that is biased by a spring 52. These serve to maintain the desired degree of tension in the twine as it is wrapped around the bale being formed. FIG. 3 also shows a hay dog 54 which acts as a pawl to allow the bale to be pushed towards the rear of the baler during the bale compressing stroke of the plunger 18 but prevents the bale from returning with the plunger 18 when the latter is retracted.

Figure 4:
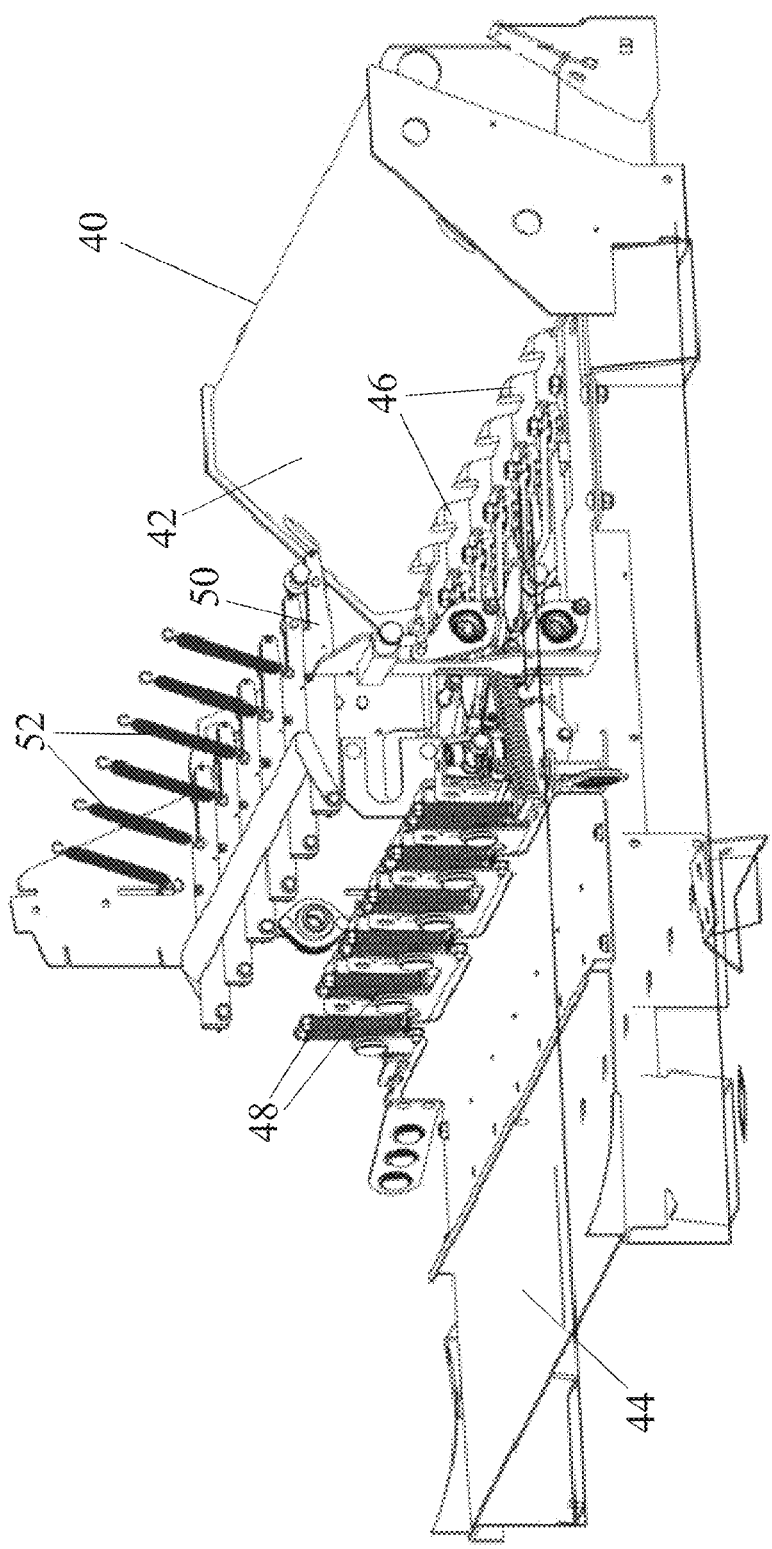
FIG. 4 is a line drawing of the same view of the baler as shown in FIG. 2, with the casing, the fans and the knotters removed.

The shape of the crossbeam 40 is best shown in the perspective view of FIG. 4, which shows the top of the baler after the casing 60, the fans and the knotters 30 have been removed leaving only the gripping devices 48 and the twine tensioning arms 50.

Figure 2:
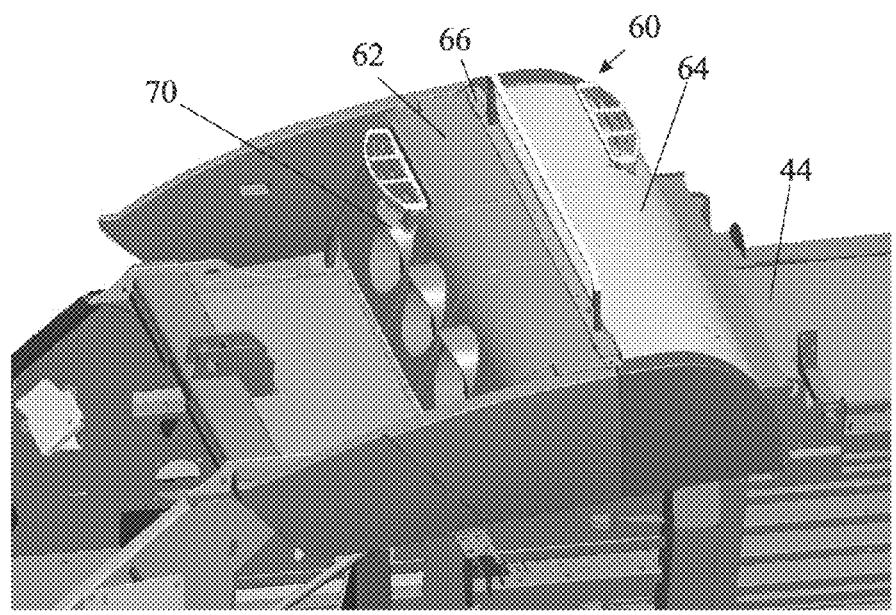
FIG. 2 is a perspective view from the front above and one side of a casing covering the knotters of a baler.

Referring again to FIG. 3, the casing 60 is made up of two doors 62 and 64, each hinged at its upper edge to a thin frame member 66 shown in FIG. 2. The front facing door 62 carries three fans, only the fixings 68 for which are shown in FIG. 3. Cowlings 70 are formed as part of the door 62 to guide the air flow into the fans. When the door 62 is pivoted clockwise, as viewed, about its upper edge it allows full access to the knotters 30 and the twine tensioning devices. This is important in order to permit rethreading of the twine in the event of a malfunction. Because of the weight of this door, which is increased by the weight of the fans, a gas strut 72 with an internal spring is used to support its weight as it is raised and lowered.

Access the other side of the knotters 30 can be gained by pivoting the second door 64 counter-clockwise, as viewed in FIG. 3.

The shape and positioning of the casing 60 is designed to increase the speed of air flow past all parts of the knotter and to avoid any dead spots. To this end, the distance between the knotters 30 and the casing 60 is kept to a minimum to maximise the speed of the air flow. Air is sucked into the casing by the fans mounted on the door 62 and exists by flowing over the inclined surface 42 of the crossbeam through the gap remaining between the door 64 and the crossbeam 40. Air can also escape by flowing beneath the crossbeam thereby avoiding all possibility of a region of stationary air at which crop can collect.

Air may further be allowed to escape from the lateral ends of the casing to avoid crop accumulation in corner regions.

The invention claimed is:

1. A square baler comprising
   a baling chamber with four side walls, a support frame surrounding walls of the baling chamber, at least one knotter mounted on an outer side of the upper wall of the baling chamber adjacent a crossbeam of the support, and
   a fan disposed on an opposite of the knotter from the crossbeam to blow away crop material from the vicinity of the knotter,
   at least part of the side of the crossbeam facing the knotter is inclined at an angle of more than ninety degrees to the upper wall of the baling chamber is order to permit a smooth flow of air from the fan past the knotter, wherein the crossbeam is shaped to provide an additional air flow passage between an underside of the crossbeam and the upper wall of the baling chamber.

2. The square baler of claim 1, wherein a casing is provided to support the fan and to encase the knotter so to guide the air flow from the fan over the knotter.

3. The square baler of claim 2, wherein the casing comprises two hinged doors that may be opened to provide access to the knotters.

4. The square baler of claim 3, wherein at least one fan for blowing air over the knotters is mounted on one of the doors.

* * * * *